US009401917B2

(12) United States Patent
Brown et al.

(10) Patent No.: US 9,401,917 B2
(45) Date of Patent: Jul. 26, 2016

(54) PRE-CACHING RESOURCES BASED ON A CACHE MANIFEST

(75) Inventors: Michael Stephen Brown, Kitchener (CA); Herbert Anthony Little, Waterloo (CA); Terrill Mark Dent, Waterloo (CA)

(73) Assignee: BlackBerry Limited, Waterloo, CA (US)

( * ) Notice: Subject to any disclaimer, the term of this patent is extended or adjusted under 35 U.S.C. 154(b) by 562 days.

(21) Appl. No.: 13/152,565

(22) Filed: Jun. 3, 2011

(65) Prior Publication Data

US 2012/0311020 A1    Dec. 6, 2012

(51) Int. Cl.
*H04W 88/04* (2009.01)
*H04L 29/06* (2006.01)
*G06F 12/08* (2016.01)
*G06F 21/62* (2013.01)
*H04L 29/08* (2006.01)

(52) U.S. Cl.
CPC ............ *H04L 63/10* (2013.01); *G06F 12/0862* (2013.01); *G06F 21/6263* (2013.01); *H04L 63/08* (2013.01); *H04L 67/2852* (2013.01); *H04L 67/2847* (2013.01); *H04W 88/04* (2013.01)

(58) Field of Classification Search
USPC ......................................................... 709/203
See application file for complete search history.

(56) References Cited

U.S. PATENT DOCUMENTS 6,748,450 B1   6/2004 Dutta
7,058,691 B1   6/2006 Yu et al.
7,254,614 B2   8/2007 Mulligan et al.
7,284,035 B2   10/2007 Yu et al.
7,457,304 B2   11/2008 Roh et al.
7,483,941 B2   1/2009 Carlson
7,509,658 B2   3/2009 Goring et al.
7,673,007 B2   3/2010 Mulligan et al.
7,730,199 B2   6/2010 Song et al.
2002/0131404 A1   9/2002 Mehta et al.
2003/0084165 A1   5/2003 Kjellberg et al.
2004/0261086 A1   12/2004 Jensen et al.

(Continued)

FOREIGN PATENT DOCUMENTS

CA    2393900 A1    1/2003
CA    2582064 A1    11/2007

(Continued)

OTHER PUBLICATIONS http://ajaxpatterns.org/Predictive_Fetch.

(Continued)

*Primary Examiner* — Sulaiman Nooristany
(74) *Attorney, Agent, or Firm* — Moffat & Co.

(57) ABSTRACT

A method executed on a first electronic device for accessing an application server on a second electronic device includes receiving a cache manifest for an application, the cache manifest identifying a resource item that can be pre-cached on the first electronic device, pre-caching the resource item as a cached resource item in a cache memory of the first electronic device prior to launching an application client on the first electronic device. The method further includes, upon launching the application client on the first electronic device, retrieving data from the application server, wherein the data includes content and a reference to the resource item, obtaining, from the cache memory, the cached resource item that corresponds to the resource item, and displaying an output based upon the content and the cached resource item.

13 Claims, 7 Drawing Sheets

(56) References Cited

U.S. PATENT DOCUMENTS

| | | | |
|---|---|---|---|
| 2005/0091357 | A1 | 4/2005 | Krantz et al. |
| 2007/0033569 | A1 | 2/2007 | Davidson et al. |
| 2007/0260674 | A1 | 11/2007 | Shenfield |
| 2008/0320225 | A1* | 12/2008 | Panzer et al. .......... 711/130 |
| 2009/0177732 | A1 | 7/2009 | Martin et al. |
| 2009/0234863 | A1 | 9/2009 | Evans |
| 2009/0291696 | A1 | 11/2009 | Cortes et al. |
| 2009/0318192 | A1 | 12/2009 | LeBlanc et al. |
| 2011/0021219 | A1 | 1/2011 | LeBlanc et al. |
| 2011/0040718 | A1* | 2/2011 | Tendjoukian ........... G06N 5/02 706/52 |
| 2012/0084833 | A1* | 4/2012 | Thomas ........... G06F 17/30867 726/3 |
| 2012/0164974 | A1 | 6/2012 | Erikkson et al. |

FOREIGN PATENT DOCUMENTS

| | | |
|---|---|---|
| CA | 2710036 A1 | 7/2009 |
| CA | 2713395 A1 | 8/2009 |
| EP | 1310868 A | 5/2003 |
| EP | 2506533 A1 | 10/2012 |
| WO | 0244892 A | 6/2002 |
| WO | 02075527 A | 9/2002 |
| WO | 2008134880 A1 | 11/2008 |
| WO | 2009100539 A1 | 8/2009 |
| WO | 2012044451 A1 | 4/2012 |

OTHER PUBLICATIONS

Xian-He Sun, et al "Improving Data Access Performance With Server Push Architecture".
Precaching Definition from PC Magazine Encyclopedia.
http://www.sumobrain.com/patents/wipo/Method-system-delivery-large-content/WO2009079794.html.
http://docs.blackberry.com/en/admin/deliverables/22986/Mobile_content_delivery_status_types_894726_11.jsp.
Chakravorty R et al:"Optimizing Web Delivery Over Wireless Links: Design, Implementation, and Experiences", IEEE Journal on Selected Areas in Communications, IEEE Service Center,Piscataway, US, vol. 23, No. 2, Feb. 1, 2005, pp. 402-416, XP011126491, ISSN: 0733-8716, DOI: 10.1109/JSAC.2004.839398 *Whole Document*.
Wang Z et al: "Prefetching in World Wide Web", Global Telecommunications Conference, 1996, Globecom '96. Communications: The Key to Global Prosperity London. UK Nov. 18-22, 1996, New York, NY, USA, IEEE, US, Nov. 18, 1996, pp. 28-32, XP010220168, DOI: 10.1109/GLOCOM.1996.586110 ISBN: 978-0-7803-3336-9; * Abstract; *Sections 3-6.
Johann Marquez et al: "An Intelligent Technique for Controlling Web Prefetching Costs at the Server Side", Web Intelligence and Intelligent Agent Technology, 2008 IEEE/WIC/ACM International Conference on, IEEE, Piscataway, NJ, USA, Dec. 9, 2008, pp. 669-675, XP031402953, ISBN: 978-0-7695-3496-1; *abstract; *sections I., II.A.
Cheng-Zhong Xu et al: "Towards semantics-based prefetching to reduce web access latency", Applications and the Internet, 2003. Proceedings. 2003 Symposium on Jan. 27-31, 2003, Piscataway, NJ, USA, IEEE, Jan. 27, 2003, pp. 318-325, XP010629018, ISBN: 978-0-7695-1872-5; * Abstract; * Sections 1, 2.
Data Prefetching Algorithm in Mobile Environments—European Journal of Scientific Research—2009.
Hui Song and Guohong Cao—Cache-Miss-Initiated Prefetch in Mobile Environments.
http://www.cs.iit.edu/~scs/research/push-io/push-io.html—Server-Push Data Access Architecture.
http://www.isoc.org/inet99/proceedings/posters/106/index.htm—Prefetching Brand-new Documents for Improving the Web Performance.
http://www.multicoreinfo.com/prefetching-multicore-processors/—Data Prefetching in the Era of Multicore Processors.
Open Mobile Alliance "Generic Content Download Over the Air Specification Version 1.0" Announcement Open Mobiled Alliance, Jun. 20, 2002.
Nokia Corporation "Series 60 Platform 1.0 Interoperability Overview" Aug. 1, 2002.
Gosling J et al "The Java Language Environment a White Paper" Sun Devliers Java workshop, Oct. 1, 1995.
Peter Lubbers: "Using HTML5 Application Cache to Create Offline Web Applications . . . " Dec. 22, 2010.
Ladd Seth—"Proposal to Enhance HTML5 APP Cache for Better Performance" Feb. 11, 2013.
European Search Report from corresponding EP application No. 11175247.3 dated Feb. 27, 2013.
Canadian Intellectual Property Office, Office Action on Application No. 2,747,114 , Issued on Sep. 8, 2015.
Office Action in European Application No. 11 175 247.3, dated Sep. 16, 2013.

* cited by examiner

PRE-CACHING RESOURCES BASED ON A CACHE MANIFEST

TECHNICAL FIELD

The present technology relates generally to communications between web server and web client and, more particularly, to portable electronic devices accessing a remote web application.

BACKGROUND

A client application may access a server application using known protocols. For example, a web client that accesses a web server may use commonly known protocols, such as Hypertext Transfer Transfer Protocol (HTTP), WebSockets, etc. Typically, a response from a web server includes a document that conforms to known formatting languages, such as Hypertext Markup Language (HTML), eXtensible Markup Language (XML), or others. Web content may be cached, i.e. temporarily stored as a technique to reduce bandwidth usage, server load, and response lag. Quite frequently an initial document provided by the web server will include references to further content that the web client must retrieve to properly display a web page.

In traditional web browsers, it is common for a web browser to pre-fetch further resources based on the web page which is currently being viewed. Pre-fetching further content based on the initial document enables a web browser to obtain additional content that might be subsequently requested by the user of the web browser. A common challenge with pre-fetching techniques is predicting which additional content might be subsequently requested.

Recently, new types of electronic devices are being developed. A tablet-style mobile device (referred to herein simply as a "tablet") may be tethered to another electronic device such as a mobile communications device to exploit the radiofrequency transceiver of the latter for transmitting and receiving data over a wireless network. This enables the tablet to surf the Web, exchange e-mails or perform myriad other tasks that require Internet connectivity. The tablet may be tethered by a cable or wirelessly, e.g. via Bluetooth®, Wi-Fi™ or any other short-range wireless protocol common to both devices. When tethered, the wireless communications device serves data to the tablet as its client device.

The data transmission rate between a tablet and the wireless communications device with which it is wirelessly tethered may be limited by the connection used to tether the devices, such as Bluetooth® or other short-range radio frequency connection. The user experience may thus be degraded due to bandwidth limitations.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
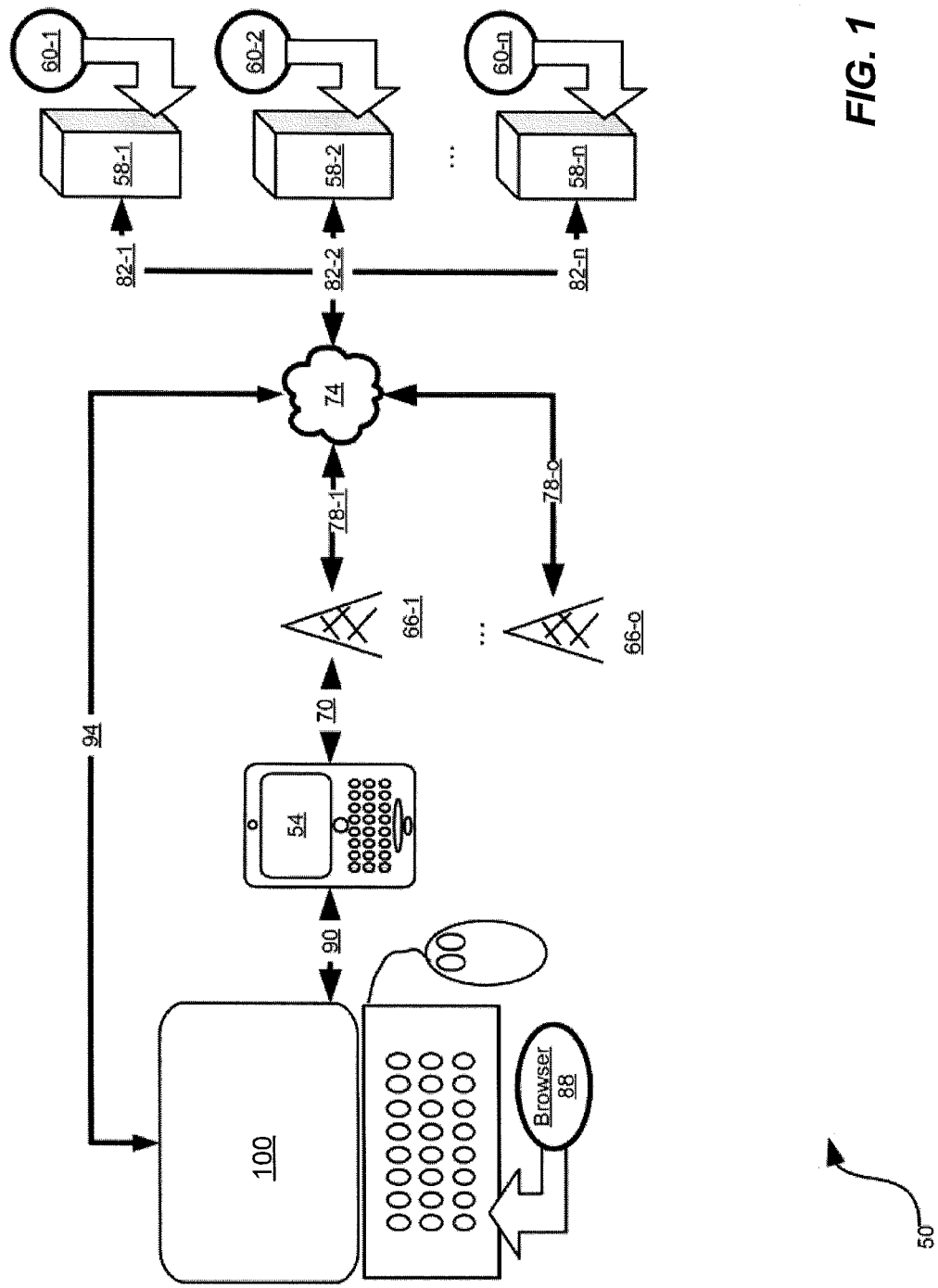
FIG. 1 depicts an example system in which the present technology may be used and includes a portable electronic device accessing a web application on a wireless communications device.

In general, the present technology provides a novel method, computer-readable medium, electronic device and system for pre-caching web content. The pre-caching techniques use a cache manifest received by the electronic device from a connected device that is serving the web content to the electronic device. In this disclosure, pre-caching refers to downloading resources prior to a time when they are needed. The resources are downloaded and stored in a cache memory in anticipation of its use upon launching a client application. Pre-caching differs from traditional caching, in that pre-caching includes storing files that are expected to be used, whereas traditional caching deals with files already requested by the client application. Further references to caching in this disclosure refer to pre-caching. Pre-caching may include downloading (e.g. fetching, requesting, receiving) a resource item and storing of the resource item in a cache memory.

One aspect of the present technology is a method executed on a first electronic device for accessing an application server on a second electronic device. The method includes receiving a cache manifest for an application, the cache manifest identifying a resource item that can be pre-cached on the first electronic device, pre-caching the resource item as a cached resource item in a cache memory of the first electronic device prior to launching an application client on the first electronic device. The method includes, upon launching the application client on the first electronic device, obtaining, from the cache memory, the cached resource item that corresponds to the resource item, and displaying an output based upon data from the application server and the cached resource item.

Another aspect of the present technology is a computer-readable medium comprising instructions in code which when loaded into a memory and executed on a processor of a mobile device is adapted to cause the mobile device to perform one the foregoing method.

Yet another aspect of the present technology is a electronic device that includes a cache memory and a processor operatively coupled to memory for executing an application client, the processor being configured to receive a cache manifest for an application, the cache manifest identifying a resource item that can be pre-cached on the electronic device, pre-cache the resource item as a cached resource item in a cache memory of the electronic device prior to launching an application client on the electronic device. Upon launching the application client on the electronic device, the processor is configured to obtain, from the cache memory, the cached resource item that corresponds to the resource item, and display an output based upon data from the application server and the cached resource item.

In this disclosure, retrieving web content may be referred to as fetching (e.g. requesting and receiving) web content. Web content that is fetched or retrieved is generally received from a web server or other server (e.g. a proxy or firewall). The term pre-fetching refers to the retrieval of web content prior to a time when it is needed. For example, pre-fetching may include the retrieval of second web content associated with first web content, wherein it is likely that the second web content will need to be retrieved for proper rendering of the first web content and where a request for the second web content has not yet been received. Alternatively, pre-fetching may refer to the fetching (e.g. requesting and receiving) of web content prior to receiving a user interface command associated with requesting the web content. Pre-fetching may be performed, for example, by a web browser client or a proxy client.

Pre-caching refers to the pre-fetching of the web content and storing the pre-fetched web content in a device cache so that the web content is available for subsequent rendering. When an application client is launched, the device cache is checked so that the pre-fetched web content may be obtained from the device cache without the device sending a further request for the web content. Therefore, it may be said that pre-fetching is the automated retrieval of web content, while pre-caching refers to the automated retrieval and storage of web content to a memory cache. In other words, pre-caching involves downloading data pre-emptively in anticipation of its use. This may be particularly advantageous when an electronic device uses a wireless transport to obtain the web content since the user experiences less delay when requesting to view the web content. For example, the wireless transport may have low relatively low bandwidth available for transmission of the web content.

The details and particulars of these aspects of the technology will now be described below, by way of example, with reference to the attached drawings.

FIG. 1 is a schematic representation of a system for accessing an application across a plurality of computers.

Referring now to FIG. 1, a system for accessing an application across a plurality of computers is indicated generally at 50. In the illustrated system 50, an electronic device in the form of a mobile computing device 54 is able to access at least one server 58-1, 58-2 . . . 58-*n*. (Generically, server 58, and collectively, servers 58. This nomenclature is used elsewhere herein).

A wireless link 70 connects mobile computing device 54 with one of a plurality of wireless base stations 66. In FIG. 1, mobile computing device 54 is shown as connecting to a first base station 66-1 via wireless link 70, but mobile computing device 54 can also connect to other base stations 66 in system 50. Backhaul links 78 connect each base station 66 to a network 74. Additional backhaul links 82 connect network 74 to each server 58.

Mobile computing device 54 can be any type of electronic device that can be used in a self-contained manner and to interact with content available on network 74. Interaction includes displaying of information on mobile computing device 54 as well as to receive input at mobile computing device 54 that can in turn be sent back over network 74.

It should now be understood that the nature of network 74 and links 70, 78 and 82 associated therewith is not particularly limited and are, in general, based on any combination of architectures that will support interactions between mobile computing device 54 and servers 58. In a present embodiment network 74 includes the Internet as well as appropriate gateways and backhauls to links 78 and 82. For example, backhaul links 78 and backhaul links 82 can be based on a T1, T3, O3 or any other suitable wired or wireless connections. Accordingly, the links 78 and 82 between network 74 and the interconnected components are complementary to functional requirements of those components.

Link 70 may be based on, by way of non-limiting examples, a core mobile network infrastructure, such as, by way of non-limiting examples, one or more of wireless communications standards known to persons of skill in the art.

Note that in an example variation of system 50 it is contemplated that link 70 may be a wired connection.

In the illustrated system 50, an electronic device in the form of a client machine 100 also connects to mobile computing device 54 via a link 90. In a present example implementation, client machine 100 is a desktop, notebook, tablet, or laptop computer and link 90 is a direct connection effected wirelessly or wired. Where link 90 is wireless, then link 90 can be, for example, a Bluetooth™ or a peer-to-peer Wi-Fi™ connection between client machine 100 and mobile computing device 54. Where link 90 is wired, then link 90 can be, for example, a universal serial bus (USB) or Firewire™ connection. Those skilled in the art will now recognize other types of wired or wireless connections that can be used to effect a direct connection for link 90. In variations, link 90 can be effected indirectly through, for example, a local area network or a Wi-Fi™ network, or even through a wide area network (WAN) such as network 74.

Client machine 100 is initially configured to maintain or execute at least a web browser application 88, and need not have direct access to network 74, though in some cases such a direct connection to network 74 would be possible through a link 94. Accordingly, client machine 100 can be based on any computing environment that provides web browsing functionality. For example, such a computing environment can be based on a processor or microprocessor, with accompanying volatile storage (e.g. random access memory) and non-volatile storage (e.g. Flash, Hard disk drive), read only memory (ROM), network interface card(s), video cards that connect to one or more displays, a keyboard, a mouse (or other pointing device). An operating system may be used with the processor or microprocessor to control operation of the electronic device. Browser application 100 can be any browser application can be used that is executable on a respective operating system. Typically, though not necessarily, client machine 100 will have a display or a keyboard or both that are larger than that provided on mobile computing device 54. Client machine 100 may also have another configuration, such as a tablet computing device.

Servers 58 can be based on any well-known server environment including a module that houses one or more central processing units, volatile memory (e.g. random access memory), persistent memory (e.g. hard disk devices) and network interfaces to allow servers 58 to communicate over network 74. It is contemplated that each server 58 may be implemented as a plurality of interconnected servers, in a so-called server farm, which are mirrored or otherwise configured for load balancing or failover or high availability or any or all of those.

As will be discussed further below, each server 58 may maintain a different networking application 60. Networking applications 60 can be any application whereby a corresponding client application executes on mobile computing device 54 which accesses data or any other server functions on a given server 58. Networking applications can be, by way of non-limiting examples, personal information management applications, social networking applications, or messaging applications. As will be understood, for the purposes of this disclosure the mobile computing device 54 may be a first electronic device configured to run a client application. Each server 58 may be a second electronic device which executes a corresponding server application, providing application data to the client application.

In an example embodiment, mobile computing device 54 may also comprise a server application for providing application data to the client machine 100. For example, the client machine 100 may be a first electronic device configured to run a client application and the mobile computing device 54 may be a second electronic device configured to run a corresponding server application. In one embodiment, the mobile computing device 54 acts as a client for a corresponding server 58 and the mobile computing device 54 also acts as a server for a corresponding client machine 100.

For simplicity, in this disclosure various aspects of the technology will be described in terms of a first electronic device for accessing an application server on a second electronic device. However it is contemplated that the first electronic device may be a tablet or other client machine 100 accessing a server on a mobile computing device via a short range wireless connection.

Figure 2:
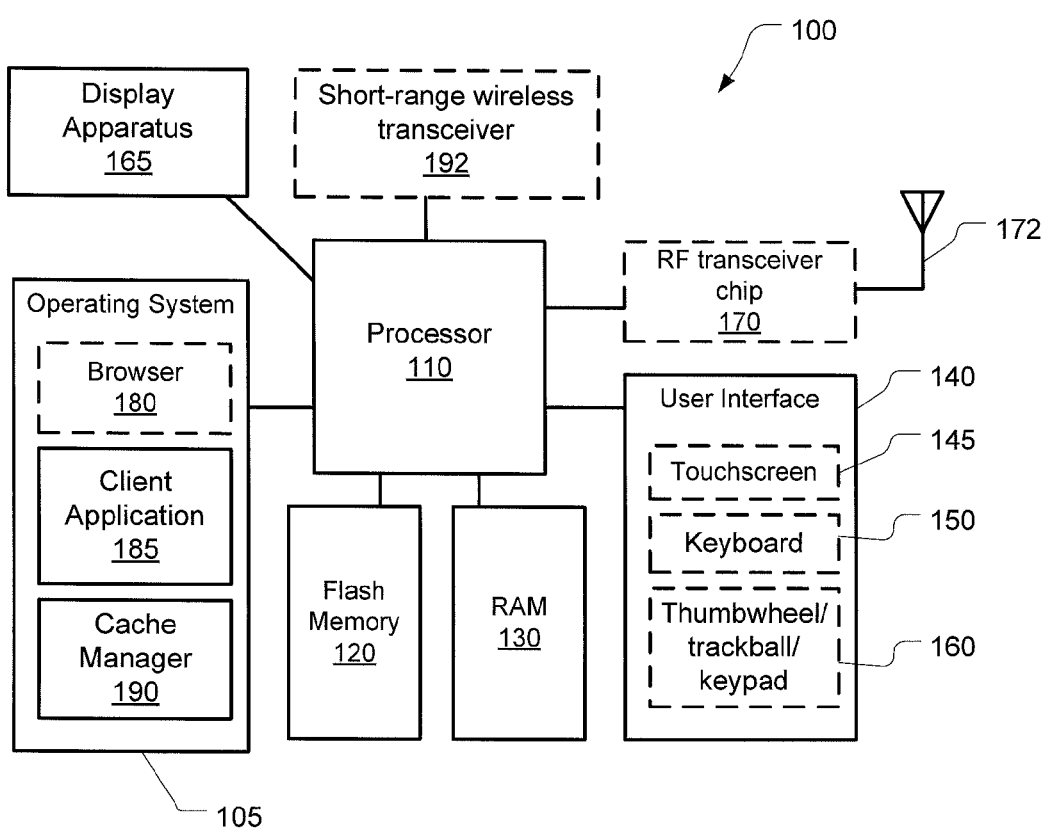
FIG. 2 depicts an electronic device operable to implement various embodiments of the present technology.

FIG. 2 is a schematic depiction of an electronic device (such as client machine 100, mobile computing device 54, or server 58) on which the present technology may be implemented. The electronic device may be a tablet, wireless communications device, notebook, laptop or the like. As shown by way of example in FIG. 2, the electronic device, which is designated generally by reference numeral 100, includes a processor (or microprocessor) 110 for executing one or more applications, memory in the form of flash memory 120 and/or RAM 130 (or any equivalent memory or storage devices) for storing the one or more applications and related data, and a user interface 140 with which the user interacts with the device. The user interface 140 of the electronic device 100 may include a touch-sensitive display screen 145. Alternatively, the user interface 140 may include a non-touch-sensitive liquid crystal display (LCD) and an alphanumeric keypad/keyboard 150. The electronic device may include a trackball, thumbwheel or trackpad 160 for cursor movement and navigation. This electronic device is powered by an onboard battery (e.g. a lithium ion battery or equivalent rechargeable battery).

As shown by way of example in FIG. 2, the electronic device 100 may include a radiofrequency (RF) transceiver chip 170 and associated antenna 172 for wireless communications using any one of known wireless communication protocols Optionally, where the device is a voice-enabled wireless communications device such as, for example, a smartphone or cell phone, the device further includes a microphone (not shown) and a speaker (not shown) and/or an outlet jack for plugging in a set of earphones. This electronic device 100 may optionally further include a Global Positioning System (GPS) receiver chipset (not shown) or other such location-determining subsystem. The electronic device 100 may also have other components or subsystems that are not shown in this simplified figure. The electronic device 100 may include a short-range wireless transceiver 192, e.g. a Bluetooth® transceiver for Bluetooth® pairing. Other short-range wireless technologies may be used. For example, the electronic device may include a Wi-Fi™ short-range wireless transceiver for establishing a peer-to-peer Wi-Fi™ connection. The electronic device 100 may include ports for cable connections, e.g. a USB port or a Firewire™ port.

The electronic device 100 may comprise an operating system 105 for use with the processor 110. Also shown in FIG. 2, the electronic device 100 may include a browser application 180, a client application 185, and a cache manager 190. The cache manager 190 may be operatively configured to implement pre-caching described in this disclosure. When the browser application 180 or client application 185 attempts to render application data, the browser application 180 or client application 185 may first check the cache manager 190 to determine if a cached resource item is already stored in the cache memory. The cache memory may be implemented, for example, in the RAM 130 of the electronic device 100.

The electronic device 100 may also comprise a display apparatus 165. The display apparatus 165 may be a display screen, such as a touch screen or other display hardware. It should be noted that the display apparatus 165 may comprise an external accessory connected using a display output interface of the electronic device 100. As contemplated herein, the display apparatus 165 may comprise an integrated display interface, or may be configured to output data to be rendered or painted to an external display unit such as an external monitor or panel, television screen, projector, or virtual retinal display (via a data port or transmitter, such as a Bluetooth® transceiver, USB port, HDMI port, DVI port, and the like). References herein to a "display" or "display apparatus" are intended to encompass both integrated and external display units.

Figure 3:
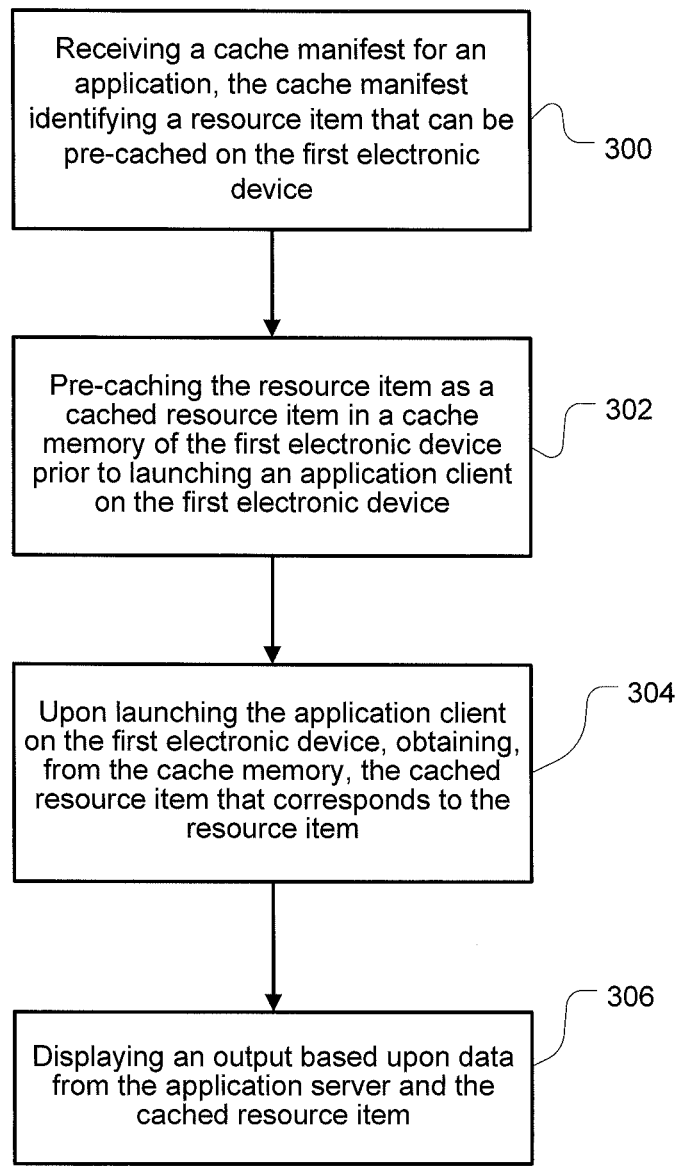
FIG. 3 depicts a method of pre-fetching data in accordance with one implementation of the present technology.

FIG. 3 depicts a method of pre-caching application resources for an application to be launched on an electronic device in accordance with one implementation of the present technology. In general, the method is executed on a first electronic device for accessing an application server on a second electronic device. The method includes receiving a cache manifest for an application, the cache manifest identifying a resource item that can be pre-cached on the first electronic device (step 300), pre-caching the resource item as a cached resource item in a cache memory of the first electronic device prior to launching an application client on the first electronic device (step 302). The method includes, upon launching the application client on the first electronic device, obtaining, from the cache memory, the cached resource item that corresponds to the resource item (step 304), and displaying an output based upon the content and the cached resource item (step 306). It should be understood that the cache manifest may include a plurality of identified resource items that can be cached prior to launching an application client.

Figure 4A:
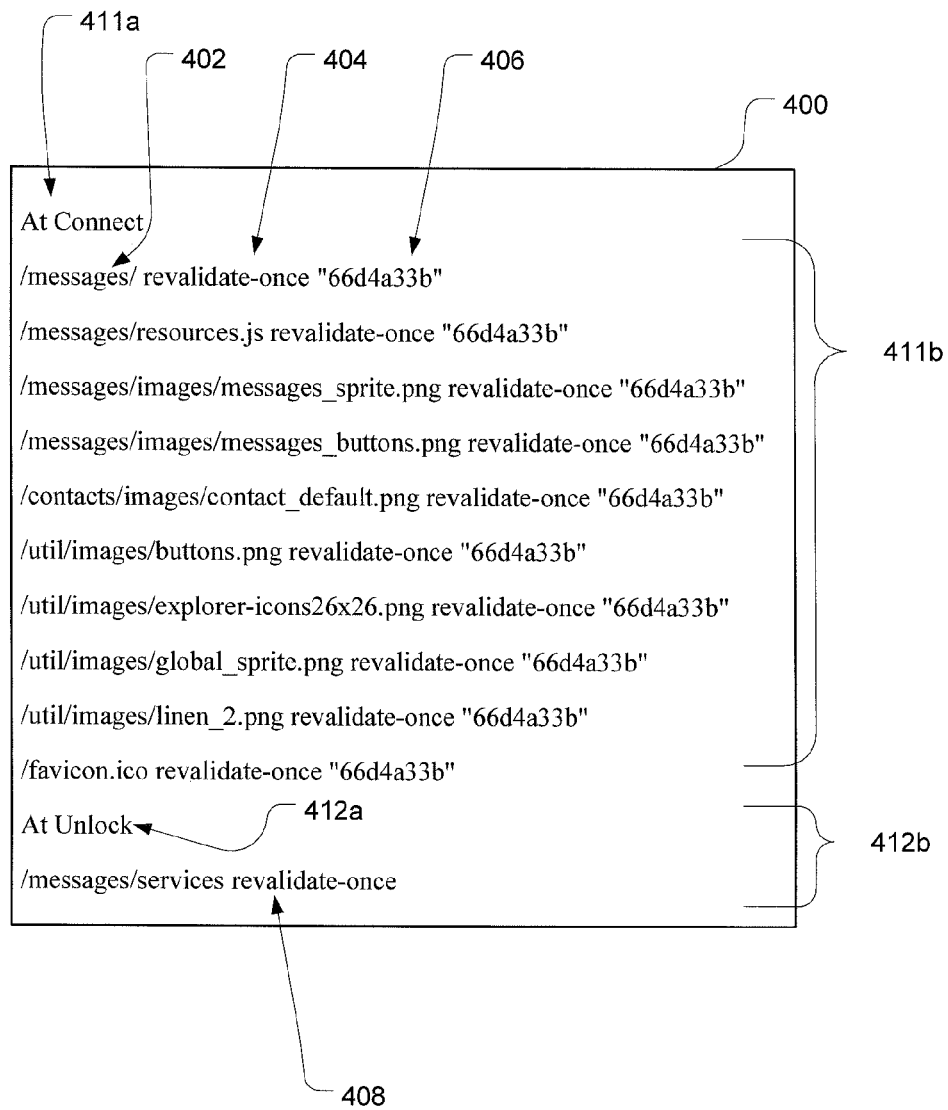
FIG. 4a and FIG. 4b are examples of a cache manifest.
Figure 4B:
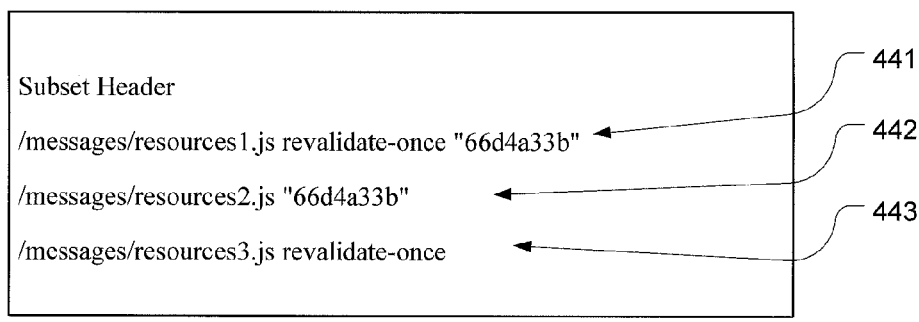

FIG. 4*a* and FIG. 4*b* are examples of a cache manifest 400. In FIG. 4*a*, which is shown solely by way of example, the cache manifest 400 contains a list of resources (or resource items) that the application requires. Each resource item contains, as shown by way of example, an resource handle 402 ("messages", "contacts", "util/images", etc.) The resource item may include a revalidation parameter 404 (e.g. revalidate-once) and an entity tag or "e-tag" 406 (e.g. "66d4a33b").

In FIG. 4*a*, the resource items 411*b* listed after the "At Connect" heading 411*a* represent a first subset of resources that the electronic device will pre-cache upon connection (i.e. communications connection being established between the client device and the server). The first subset of resources may be non-secured resources that are pre-fetched and stored in the cache memory prior to user authentication. The resource item(s) 412*b* listed after the "At Unlock" heading 412*a* represent a second subset of resources (e.g. "secured" or "private" resources) that the application will pre-cache only after user authentication. User authentication may be achieved in a variety of manners well known to persons of skill in the art—for example user authentication may be associated with the electronic device being unlocked by the user supplying a valid password, biometric input, or authentication input).

In this illustrated example, all of the non-secured resource items 412*a* have an e-tag and a revalidation parameter to revalidate once per session. In the example, the list of secured resources 412*b* contains only a single resource item 408. In this example, the resource item 408 has no e-tag but a revalidation parameter to revalidate once per session. The examples in FIGS. 4*a* and 4*b* are provided as non-limiting examples only. It is contemplated that the cache manifest may take alternative forms or include various other data about the resource items that may be pre-cached.

Revalidation is a term used herein to represent a process of verifying the integrity of a cached resource item. There are several types of revalidation described in this disclosure. An embodiment of this technology may optionally include one or more revalidation techniques. Several revalidation techniques are explained below with reference to FIG. 5.

Figure 5:
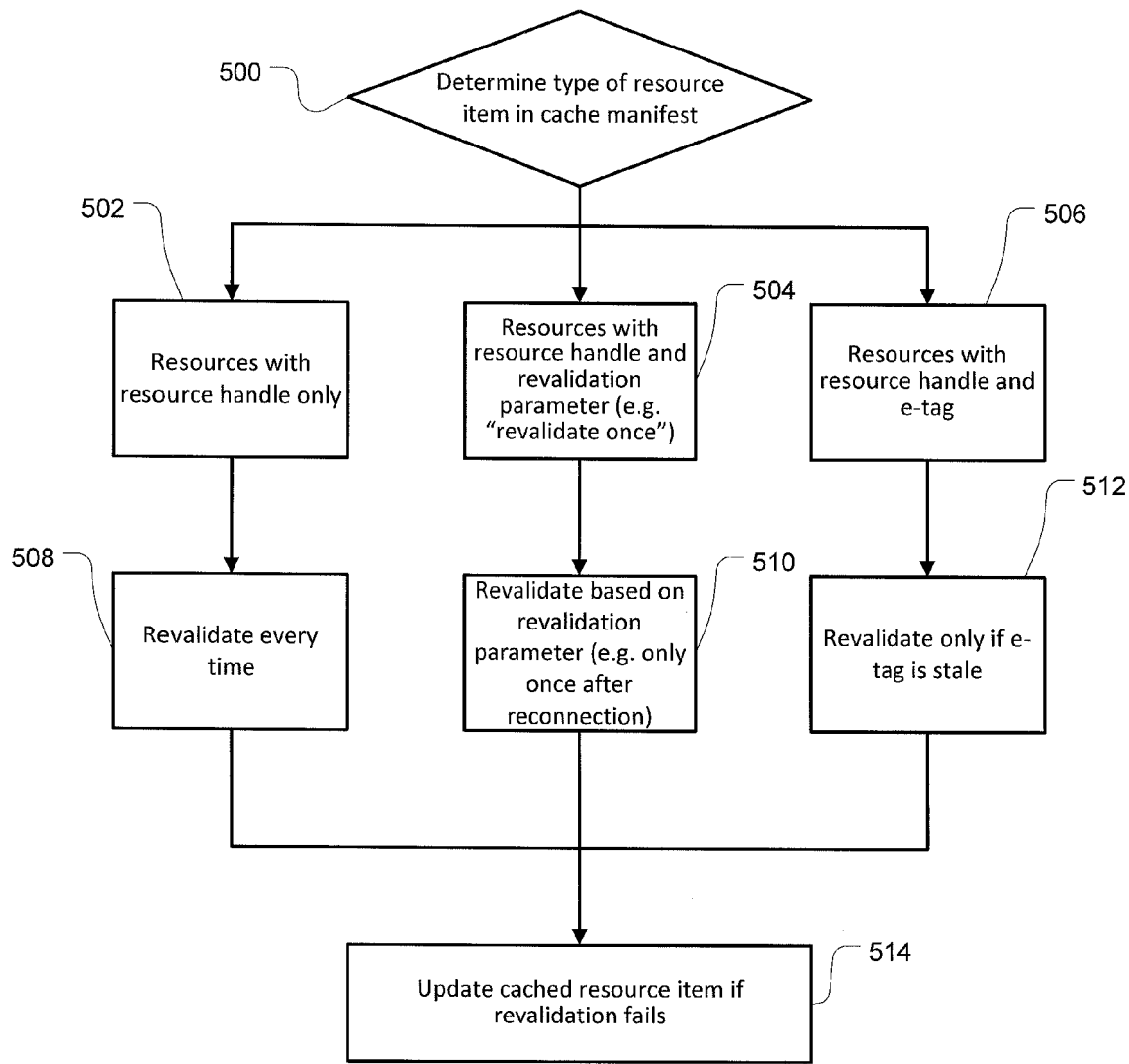
FIG. 5 is a flowchart depicting processing of different types of resources listed in a cache manifest.

FIG. 5 is a flowchart depicting processing of different types of resources that may be listed in a cache manifest. Upon receiving the cache manifest, the electronic device determines (at step 500) for each resource whether the resource needs to be revalidated. In the example presented in FIG. 5, there are three types of resource revalidation scenarios: resources with resource handle only (502), resources with resource handle and a prescribed revalidation parameter, e.g. "revalidate-once" (504), and resources with resource handle and e-tag and optionally also a revalidation parameter (506). An e-tag is an entity tag. For resource handle only (502), the resource is always revalidated (508). For resource handle and revalidation parameter (but no e-tag), the resource is revalidated according to the number of revalidations specified by the revalidation parameter. For example, if the "revalidate-once" parameter is present, the revalidation of the resource is performed only once for the session. For e-tags, on connection or reconnection, the server provides an e-tag. If the e-tag in the cache manifest matches the e-tag in the cache memory, then the electronic device (client) knows that it already has the most current (i.e. valid) resource in its cache. No further checking is required. The sending of the cache manifest by the server to the client upon connection and subsequent reconnection thus saves the client the trouble of checking with the server if the resource is valid. Revalidation (step 512) is thus performed only if the e-tag is stale (it does not match the e-tag in the cache manifest).

Figure 6:
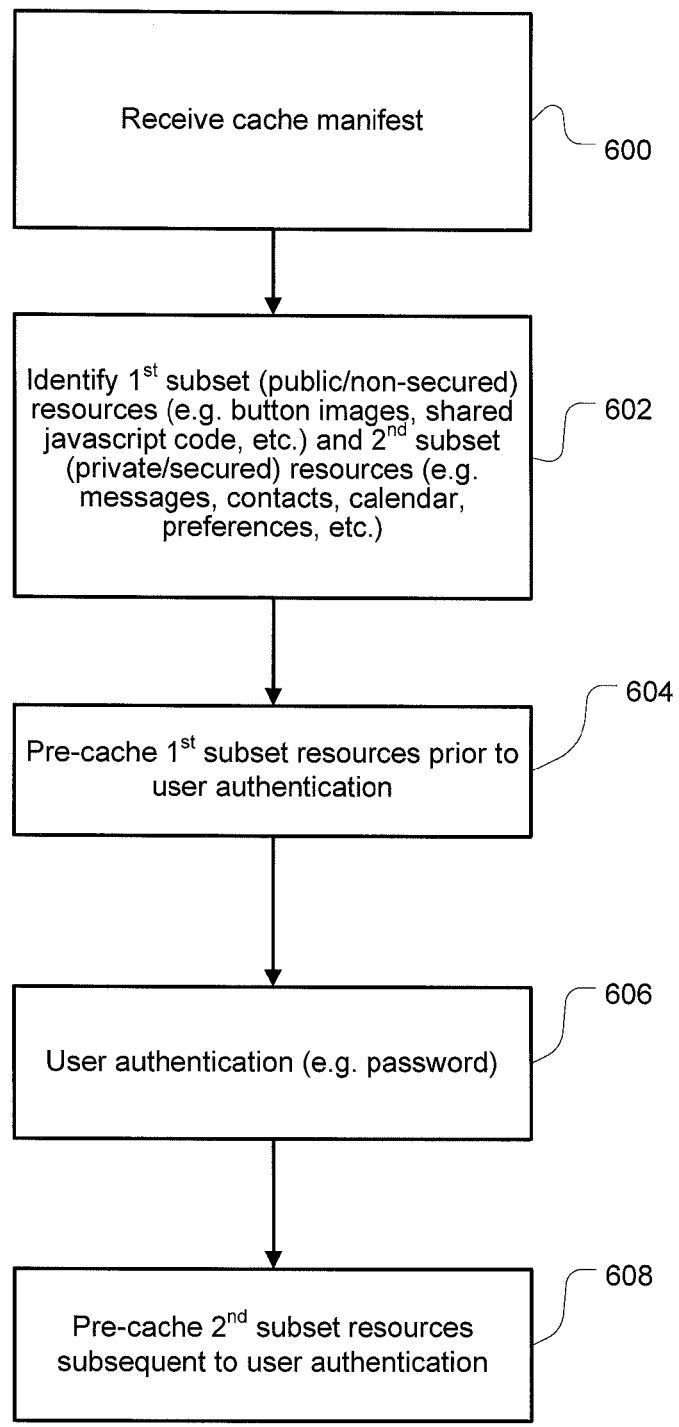
FIG. 6 is a flowchart depicting processing of public and private resources listed in a cache manifest.

FIG. 6 is a flowchart depicting processing of non-secured (public) and secured (private) resources listed in a cache manifest. In one implementation, the resources are categorized as being either secured (private) resources or non-secured (public) resources. The non-secured resources may be pre-fetched prior to user authentication (e.g. password entry and validation), whereas the secured resources may only be pre-fetched once the user authentication has been complete (e.g. once the password has been entered and validated). Examples of non-secured resources are images for buttons, shared JavaScript, etc. Examples of secured resources are contacts, preferences, messages, calendar entries, etc. As depicted by way of example in FIG. 6, upon receiving the cache manifest (step 600), a first subset of non-secured resources and a second subset of secured resources are identified (step 602). The resources of the first subset are pre-cached (step 604). After user authentication (step 606), the resources of the second subset are pre-cached (step 608).

Figure 7:
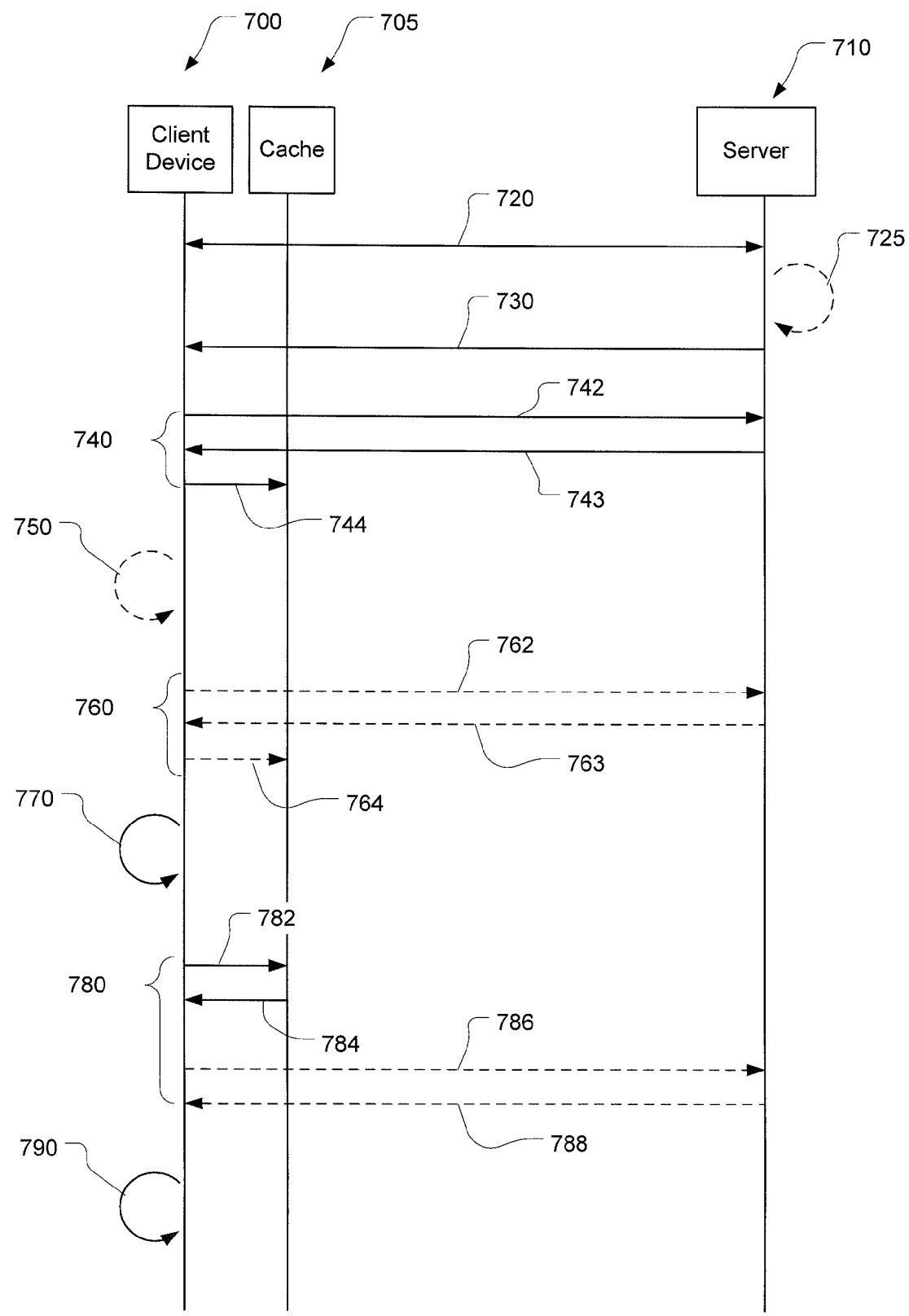
FIG. 7 is a message flow diagram in accordance with one implementation of the technology.

FIG. 7 is a message flow diagram in accordance with one implementation of the technology. The message flow diagram shows the flow of messages between a first electronic device (client device 700) and a second electronic device (the server 710). The server 710 is serving web content to the client device 700. Also shown are the communications between the client device 700 and its cache memory 705. The process is initiated by establishing a connection (at step 720) between the client device 700 and the server 710. At optional step 725, the server generates a cache manifest. A cache manifest may already be available (or have been previously generated prior to connection). At step 730, the cache manifest is received from the server 710. Upon receiving the cache manifest, the electronic device (i.e. client device 700) checks the resources it has in its cache memory against those listed in the cache manifest. If the connection formed at 720 is the first connection between the client device 700 and the server 710, the cache may be empty. The first subset of resources will be pre-cached to fill the cache with cached resource items. On the other hand, if the connection formed at 720 is not the first connection between the client device 700 and the server 710, the cache may already have cached resources stored. Resources may be revalidated using entity tags ("e-tags") as will be explained below.

If the cache manifest includes resource items identified as belonging to subsets, the client device 700 may also identify a first subset of resource items in the cache manifest to pre-cache prior to a condition and a second subset of resource items in the cache manifest to pre-cache after the condition. For example, the first subset of resource items may be associated with non-secured (public) application resources and a second subset of the resource items may be associated with secured (private) application resources. In one embodiment, as illustrated by way of example in FIG. 4a, the cache manifest may be constructed such that the public (non-secured) resources are listed separately from the private (secured) resources to facilitate identification. Alternatively, other metadata or cache manifest formats may be used to identify subsets of resource items.

The first subset may be pre-cached (740) prior to user authentication (750), e.g. prior to password entry and authentication. Pre-caching (740) of the resources belonging to the first subset may entail, as illustrated in this embodiment, pre-fetching (via request 742 and response 743) and storing (744) in the cache memory.

The second subset may only be pre-cached (step 760) once the user authentication (750) is complete (e.g. after the user has entered a password and the password has been validated by the electronic device or by the server). Pre-caching (760) of resources from the second subset may entail pre-fetching (via request 762 and response 763) and storing (764) in the cache memory.

Pre-fetched and pre-cached web content is thus available for more rapid access. This may be referred to as "priming the cache". This has the effect of speeding up the start-up time for applications on the electronic device. When an application is launched (770), e.g. in response to a command received at the user interface of the client device, the content for the application is retrieved or obtained (780). Pre-cached content is obtained from the local memory cache on the client device (via request 782 and response 784). Supplemental or additional data may be retrieved also, as needed, from the application server (via request 786 and response 788). In other words, content may also be retrieved/fetched from the server to supplement the pre-cached content. Application content is then rendered at step 790. In other words, the client device 700 displays an output based upon the content (data retrieved from the application server) and the cached resource item.

The present technology may be implemented on any electronic device or computing device that is connected, "bridged", "tethered", or "paired" to another electronic device or computing device. An electronic device such as a handheld electronic device, wireless communications device or tablet may be connected to another such handheld electronic device, wireless communications device or tablet, to a laptop, to a desktop or to any other computing device. In one exemplary embodiment, a tablet (that may not have its own cellular RF transceiver) may be wirelessly connected to a wireless communications device. Such bridging may be accomplished by pairing the tablet to the wireless communications device using Bluetooth® or any other short-range wireless technology. The wireless communications device thus acts as a server and serves web application data to the tablet. Accordingly, one exemplary application of this technology is a system for fetching data for caching on a first mobile device (e.g. a tablet) tethered wirelessly to a second mobile device (e.g. a wireless communications device). The first mobile device has a first processor, a first memory and a first short-range wireless transceiver and the second mobile device has a second processor, a second memory and (in addition to a cellular RF transceiver) a second short-range wireless transceiver for wirelessly tethering the first mobile device to the second mobile device via Bluetooth® or other short-range wireless connection. The first mobile device receives a cache manifest from the second mobile device listing all data that can be fetched from the second mobile device. The processor determines from the cache manifest which data to pre-fetch and cache. When the application client on the first mobile device is launched, the first mobile device (e.g. tablet) obtains, from the cache memory, the cached resource item that corresponds to the resource item. The first mobile device can then display an output (application content) based upon data obtained from both the application server and from the cache memory. As noted above, this technology may be used to pre-cache data for any electronic devices that are connected in a client-server relationship, whether the electronic devices are mobile devices, notebooks, laptops, tablets, or desktop computers.

Any of the methods discloses herein may be implemented in hardware, software, firmware or any combination thereof. Where implemented as software, the method steps, acts or operations may be programmed or coded as computer-readable instructions and recorded electronically, magnetically or optically on a non-transitory computer-readable medium, computer-readable memory, machine-readable memory or computer program product. In other words, the computer-readable memory or computer-readable medium comprises instructions in code which when loaded into a memory and executed on a processor of a mobile device or other computing device cause the mobile device or other computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This new technology has been described in terms of specific implementations and configurations which are intended to be exemplary only. Persons of ordinary skill in the art will, having read this disclosure, readily appreciate that many obvious variations, refinements and modifications may be made without departing from the inventive concept(s) disclosed herein and as defined in the appended claims.

The invention claimed is:

1. A method executed on a first electronic device for accessing an application server via a second electronic device, the method comprising:

establishing a tethered communications connection between the first electronic device and the second electronic device over a short-range wireless protocol connection, the second electronic device serving data received from the application server to the first electronic device when tethered to the first electronic device;

responsive to the establishing of the communications connection, receiving via the second electronic device a cache manifest for a server application, the cache manifest identifying a plurality of resource items that can be pre-cached on the first electronic device;

pre-caching, subsequent to the tethered communications connection and prior to user authentication, a first subset of the resource items associated with non-secured application resources as a first subset of the plurality of resource items in a cache memory of the first electronic device prior to launching an application client corresponding to the server application on the first electronic device;

pre-caching, after the user authentication, a second subset of the resource items associated with secured application resources as a second subset of the plurality of resource items in the cache memory of the first electronic device;

upon launching the application client on the first electronic device, obtaining, from the cache memory, the cached resource items that corresponds to the resource items; and displaying an output based upon data received via the second electronic device from the application server and the cached resource items;

wherein the pre-caching comprises:

requesting the resource items from the second electronic device;

receiving the resource items and entity tags associated therewith; and storing the resource items and the entity tags in the cache memory of the first electronic device.

2. The method of claim 1, wherein pre-caching includes pre-fetching and storing the resources item in the cache memory.

3. The method of claim 1 wherein the cache manifest includes an entity tag associated with a first resource item, the method further comprising:

checking the cache memory for the entity tag to determine if the first resource item is already stored in the cache memory; and if the first resource item is not already in the cache memory, pre-fetching the first resource item from the second electronic device.

4. The method of claim 1 wherein the cache manifest identifies a first resource item but does not include an entity tag associated with the first resource item, the method further comprising:

checking the cache memory for the first resource item to determine if the first resource item is already stored in the cache memory; and if the first resource item is already is the cache memory, retrieving from the cache memory a first entity tag associated with the first resource item, sending the first entity tag to the second electronic device; and receiving from the second electronic device either an updated version of the first resource item or an acknowledgement that the first resource item in the memory cache is valid.

5. The method of claim 1 wherein the short-range wireless protocol connection is between a tablet as the first electronic device and a wireless communications device as the second electronic device, the wireless communications device serving web application resources to the tablet for rendering on the tablet.

6. The method of claim 5 further comprising:
receiving from the wireless communications device a list of applications to provide on the tablet;
receiving one cache manifest for each of the list of applications;
identifying from each cache manifest which one or more application resources require revalidation; and
if revalidation is required, revalidating the one or more application resources.

7. A non-transitory computer-readable medium storing instructions in code which when loaded into memory and executed on a processor of an electronic device cause the device to:
establish a tethered communications connection between the first electronic device and the second electronic device over a short-range wireless protocol connection, the second electronic device serving data received from an application server to the first electronic device when tethered to the first electronic device;
responsive to the establishment of the communications connection, receive via the second electronic device a cache manifest for a server application, the cache manifest identifying a plurality of resource items that can be pre-cached on the first electronic device;
pre-cache, subsequent to the tethered communications connection and prior to user authentication, a first subset of the resource items associated with non-secured application resources as a first subset of the plurality of resource items in a cache memory of the first electronic device prior to launching an application client corresponding to the server application on the first electronic device;
pre-cache, after the user authentication, a second subset of the resource items associated with secured application resources as a second subset of the plurality of resource items in the cache memory of the first electronic device;
upon launching the application client on the first electronic device, obtain, from the cache memory, the cached resource items that corresponds to the resource items; and
display an output based upon data received via the second electronic device from the application server and the cached resource items;
wherein the code for pre-caching comprises code for:
requesting the resource items from the second electronic device;
receiving the resource items and entity tags associated therewith; and
storing the resource items and the entity tags in the cache memory of the first electronic device.

8. The non-transitory computer-readable medium of claim 7 wherein the code causing the device to pre-cache includes code causing the device to pre-fetch and store the resource item in the cache memory.

9. The non-transitory computer-readable medium of claim 7 wherein the cache manifest includes an entity tag associated with a first resource item, and wherein the computer-readable medium further comprises code for:
checking the cache memory for the entity tag to determine if the first resource item is already stored in the cache memory; and
if the first resource item is not already in the cache memory, pre-fetching the first resource item from the second electronic device.

10. The non-transitory computer-readable medium of claim 7 wherein the cache manifest identifies a first resource item but does not include an entity tag associated with the first resource item, and wherein the computer-readable medium further comprises code for:
checking the cache memory for the first resource item to determine if the first resource item is already stored in the cache memory; and
if the first resource item is already is the cache memory, retrieving from the cache memory a first entity tag associated with the first resource item,
sending the first entity tag to the second electronic device; and
receiving from the second electronic device either an updated version of the first resource item or an acknowledgement that the first resource item in the memory cache is valid.

11. An electronic device comprising:
a cache memory; and
a processor operatively coupled to memory for executing an application client, the processor being configured to:
establish a tethered communications connection between the first electronic device and the second electronic device over a short-range wireless protocol connection, the second electronic device serving data received from the application server to the first electronic device when tethered to the first electronic device;
responsive to the establishment of the communications connection, receive via the second electronic device a cache manifest for a server application, the cache manifest identifying a plurality of resource items that can be pre-cached on the electronic device;
pre-cache, subsequent to the tethered communications connection and prior to user authentication, a first subset of the plurality of resource items associated with non-secured application resources as a first subset of cached resource items in a cache memory of the electronic device prior to launching an application client corresponding to the server application on the electronic device;
pre-cache, after the user authentication, a second subset of the resource items associated with secured application resources as a second subset of the plurality of resource items in the cache memory of the first electronic device;
upon launching the application client on the electronic device, obtain, from the cache memory, the cached resource items that corresponds to the resource items; and
display an output based upon data received via the second electronic device from the application server and the cached resource items;
wherein the processor is further configured to cause the electronic device to:
request the resource items from the second electronic device;
receive the resource items and entity tags associated therewith; and
store the resource items and the entity tags in the cache memory of the first electronic device.

12. The electronic device of claim 11 wherein the cache manifest includes an entity tag associated with a first resource item, the processor being further configured to cause the electronic device to:

check the cache memory for the entity tag to determine if the first resource item is already stored in the cache memory; and if the first resource item is not already in the cache memory, pre-fetch the first resource item from the second electronic device.

13. The electronic device of claim 11 wherein the cache manifest identifies a first resource item but does not include an entity tag associated with the first resource item, the processor being further configured to cause the electronic device to:

check the cache memory for the first resource item to determine if the first resource item is already stored in the cache memory; and if the first resource item is already is the cache memory, retrieve from the cache memory a first entity tag associated with the first resource item, send the first entity tag to the second electronic device; and receive from the second electronic device either an updated version of the first resource item or an acknowledgement that the first resource item in the memory cache is valid.

\* \* \* \* \*